United States Patent [19]

Shiraishi

[11] Patent Number: 4,807,068
[45] Date of Patent: Feb. 21, 1989

[54] EJECT MECHANISM OF DISK RECORDING/REPRODUCING APPARATUS HAVING MECHANISM FOR PREVENTING ACCIDENTAL HEAD LOWERING

[75] Inventor: Yukiya Shiraishi, Furukawa, Japan

[73] Assignee: Alps Electric Co., Ltd., Japan

[21] Appl. No.: 183,329

[22] Filed: Apr. 7, 1988

Related U.S. Application Data

[63] Continuation of Ser. No. 847,749, Apr. 3, 1986, abandoned.

[30] Foreign Application Priority Data

Mar. 4, 1985 [JP] Japan .............................. 60-49545[U]

[51] Int. Cl.$^4$ ............................................. G11G 5/012
[52] U.S. Cl. ................................. 360/99.06; 360/105; 369/77.1
[58] Field of Search ...................... 360/97, 99, 105, 86, 360/133; 369/77.2

[56] References Cited

U.S. PATENT DOCUMENTS

| | | | |
|---|---|---|---|
| 3,484,111 | 12/1969 | Staar | 369/77.1 |
| 4,139,876 | 2/1979 | Owens | 360/97 |
| 4,360,844 | 11/1982 | Maiers | 360/99 |
| 4,415,940 | 11/1983 | Becker | 360/99 |
| 4,604,666 | 8/1986 | Kitahara et al. | 360/133 X |
| 4,636,896 | 1/1987 | Takikawa | 360/97 X |
| 4,709,281 | 11/1987 | Inoue et al. | 360/97 |

Primary Examiner—Robert S. Tupper
Assistant Examiner—Andrew L. Sniezek
Attorney, Agent, or Firm—Guy W. Shoup; Paul J. Winters; Leighton K. Chong

[57] ABSTRACT

A recording/reproducing apparatus for a disc, having an ejector with which an insertion-side fore end of the disc comes into abutment and which is urged toward a disc insertion opening, and a lock mechanism for locking the ejector when the disc has been inserted up to a drive position, the disc being ejected by a returning force of the ejector, characterized in that there is provided a support member for supporting an arm with an upper writing/reading head attached thereto and in that the ejector is provided with an engaging mechanism for allowing the support member to hold the arm in an upper position when clamping operation is performed without insertion of the disc.

1 Claim, 5 Drawing Sheets

EJECT MECHANISM OF DISK RECORDING/REPRODUCING APPARATUS HAVING MECHANISM FOR PREVENTING ACCIDENTAL HEAD LOWERING

This is a continuation application from application Ser. No. 847,749 filed Apr. 3, 1986, now abandoned.

BACKGROUND OF THE INVENTION

1. Field of the Invention

The present invention relates to a recording/reproducing apparatus for a disc to be used in electronic computers, word processors, or the like for recording and reproducing information magnetically with respect to a recording surface of the disc. Particularly, it is concerned with an eject mechanism for performing insertion and discharge of a disc.

2. Description of the Prior Art

An example of an eject mechanism in a conventional recording/reproducing apparatus for disc is as disclosed in Japanese Utility Model Application No. 31223/84. This conventional eject mechanism is constructed as shown in FIGS. 10 to 13 and its operation is as follows.

When a disc 4 is pushed in the direction of arrow G in FIG. 10, a fore end portion 4a of the disc 4 engages a stepped portion 40a of an ejector 40, so that the ejector 40 moves in the direction of arrow G together with the disc 4 against the force of a spring 41. When a pawl portion 40b of the ejector 40 reaches the position of a hole 42a formed in a mounting plate 42, it fits into the hole 42a under a pivoting force in the direction of arrow H induced by the spring 41 as shown in FIGS. 11 and 12 and thus a first lock, or a temporary lock, is effected.

Then, a clamp mechanism for the disc 4 operates and in synchronism therewith a stopper 43 descends in a direction orthogonal to the paper surface of FIG. 10. As a result, an eject lever 44 is moved in the direction of arrow I in FIG. 12 pivotally by virtue of a spring 45 and a convex portion 44a thereof fits in a concave portion 40c of the ejector 40, whereby a second lock, or a regular lock, is effected. At the same time, the ejector 40 is turned in the direction of arrow I in FIG. 12 by the pivoting force of the eject lever 44 against its pivoting force in the direction of arrow H in FIG. 12 induced by the spring 41, so that the temporary lock of the pawl portion 40b and the hole 42a is released. Further, an arm 46 moves down with descent of the stopper 43 and a pad 47 is positioned oppositely above a predetermined face portion of the disc 4.

In the eject operation, the stopper 43 moves up upon release of the clamp mechanism, so that the eject lever 44 pivots in the direction of arrow J in FIG. 13 against the force of the spring 45. At the same time, the arm 46 goes up and the pad 47 moves away from the surface of the disc 4. And the regular lock between the convex portion 44a and the concave portion 40c of the ejector 40 is released by the pivotal movement of the eject lever 44 in the direction of arrow J, so that the ejector 40 and the disc 4 are discharged toward the insertion opening by virtue of the spring 41.

According to the above prior art construction, only the stopper 43 lifts and supports the arm 46, so when the clamping operation is performed, the arm 46 goes down toward a lower head (not shown) regardless of whether the disc 4 is inserted or not. In the case of a conventional double-sided type recording/reproducing apparatus for disc, an upper head (not shown) is attached to the arm 46 instead of the pad 47, and if the clamping operation is done without insertion of the disc 4, the upper head will descend and abut the lower head directly, so there is a fear of damage of both heads. Moreover, if a strong external vibration or shock is applied to both heads in such contacted state, the heads will strike against each other and be damaged.

SUMMARY OF THE INVENTION

Accordingly, it is the object of the present invention to provide a recording/reproducing apparatus for a disc in which an arm with an upper head attached thereto is held up by an eject lever of an eject mechanism to prevent contact of upper and lower heads to thereby prevent damage of both heads.

According to the present invention, in order to achieve the above object, there is provided a recording/reproducing apparatus for a disc, having an ejector 29 with which an insertion-side fore end of a disc 4 comes into abutment and which is urged toward an insertion opening for the disc 4, and a lock mechanism 24e, 29c for locking the ejector 29 when the disc 4 has been inserted up to a drive position, the disc 4 being ejected by a returning force of the ejector 29, characterized in that there is provided a support member 25a for supporting an arm 21 with an upper writing/reading head 22 attached thereto and in that the ejector 29 is provided with an engaging mechanism 29b for allowing the support member 25a to hold the arm in an upper position when clamping operation is performed without insertion of the disc 4.

The above apparatus operates as follows. When clamping operation is done without insertion of the disc 4, the ejector 29 shown in FIG. 2 does not move in the direction of insertion of the disc 4 and in this state both an eject lever 25 which is pivotally urged in the direction of arrow C as shown in FIG. 3 and the ejector 29 which is in abutment with an operating plate 25d of the eject lever 25 start pivoting in the direction of arrow C about a support shaft 26, but this pivotal movement is stopped upon abutment of the engaging portion 29b of the ejector 29 with a retaining plate 24f of a mounting plate 24. And in this state the support portion 25a of the eject lever 25 holds an arm portion 21a of the arm in an upper position, so an upper head 22 and a lower head 20 are kept out of abutment with each other. Thus, it is possible to prevent the heads 20 and 22 from being damaged by collision, for example.

BRIEF DESCRIPTION OF THE DRAWINGS

FIGS. 2 to 9 show an example of an eject mechanism used in the recording/reproducing apparatus, of which:

FIGS. 2, 3 and 4 are a partially cut-away plane view of the eject mechanism, a side view thereof and a front view of a principal portion thereof, respectively, in an unclamped state with a disc not inserted;

FIGS. 5 and 7 are a partially cut-away plan view of the eject mechanism and a front view of a principal portion thereof, respectively, in a temporarily locked state;

FIG. 6 is a partially cut-away side view of the eject mechanism in a disc clamped state; and FIGS. 8 and 9 are a plan view and a side view, respectively, of an eject lever;

FIGS. 10 to 13 show a conventional example of an eject mechanism, of which:

FIG. 10 is a plan view of a recording/reproducing apparatus and a disc about to be inserted therein;

FIGS. 11 and 12 are a plan view and a partially cut-away side view, respectively, in a temporarily locked state; and FIG. 13 is a partially cut-away side view in a disc clamped state.

DESCRIPTION OF A PREFERRED EMBODIMENT

An embodiment of the present invention will be described hereinunder with reference to the drawings to further illustrate the invention.

Figure 1:
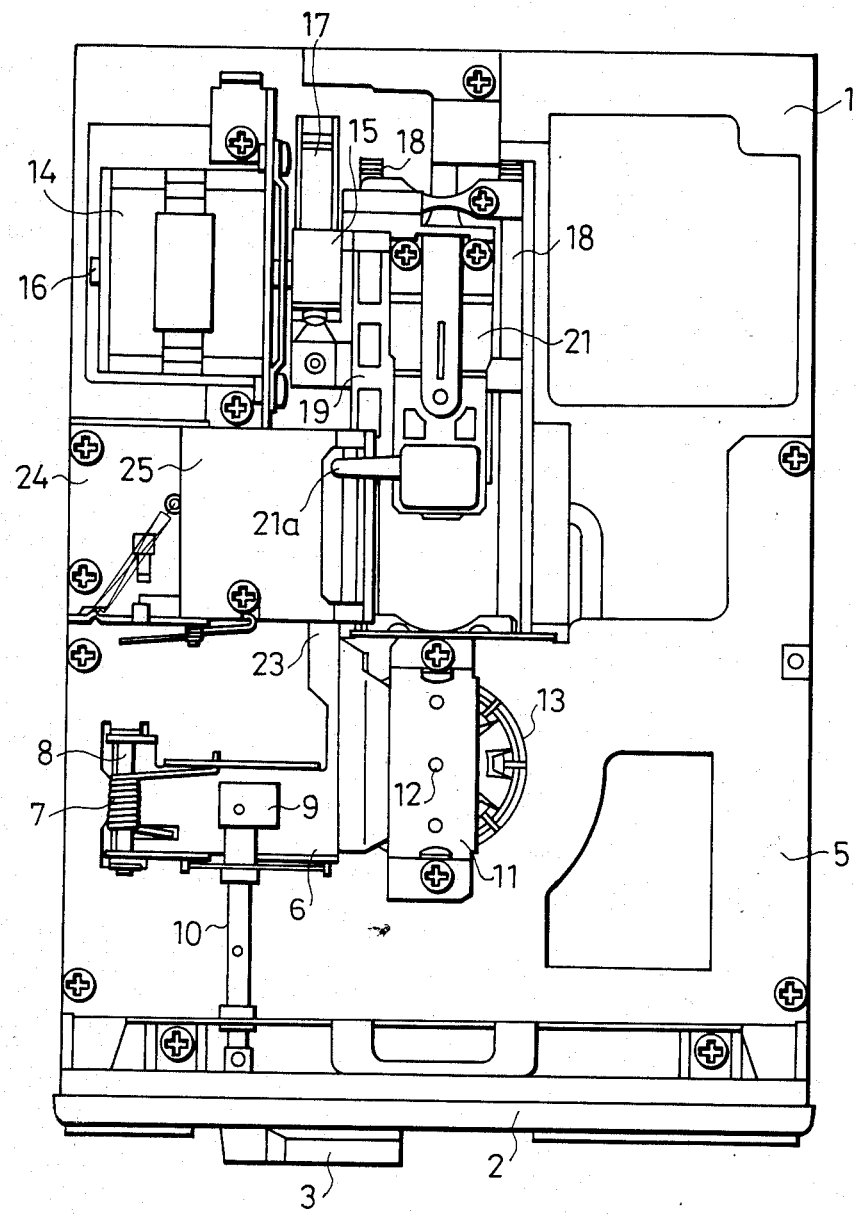
FIG. 1 is a plan view of a recording/reproducing apparatus according to an embodiment of the present invention.

Referring first to FIG. 1, there is illustrated in plan view a recording/reproducing apparatus for disc embodying the invention, in which the reference numeral 1 denotes a housing formed by aluminum die casting, for example; the numeral 2 denotes a front plate formed of a synthetic resin fixed to a front face of the housing 1; numeral 3 denotes an operating lever for opening and closing an insertion opening for an information recording/reproducing disc 4 (see FIG. 3) and also for clamping and ejecting the disc 4; numeral 5 denotes a frame fixed with bolts to an upper surface of the housing 1; numeral 6 denotes a clamp lever which is urged in a counterclockwise direction when viewed from the front plate 2 side pivotally about a support shaft 8 by means of a coiled spring 7; and numeral 9 denotes a cam connected to the operating lever 3 through a support shaft 10. When the operating lever 3 is turned in a clockwise direction when viewed from the front plate 2 side, the cam 9 causes the clamp lever 6 to go down against the force of the coiled spring 7. Numeral 11 denotes a generally convex guide plate fixed with bolts to an upper surface of the frame 5; numeral 12 denotes a shaft suspended in a central position of the guide plate 11; and numeral 13 denotes a hub which is mounted inside the guide plate 11 rotatably about the shaft 12. The hub 13 is adapted to move up and down along the shaft 12 interlockedly with the pivotal motion of the clamp lever 6 to clamp the disc 4.

Numeral 14 denotes a stepping motor fixed to a left rear end of the housing 1; numeral 15 denotes a pulley fixed to a rotational shaft 16 of the stepping motor 14; numeral 17 denotes a steel belt which is wound round the pulley 15 in a generally α form; numeral 18 denotes a guide shaft which is fixed to the housing 1 and which is provided in a pair; numeral 19 denotes a carriage which carries thereon an information writing/reading lower head 20 (see FIGS. 3 and 6), with both ends of the steel belt 17 being attached thereto with bolts; and numeral 21 denotes an arm held pivotably at one end thereof above the carriage 19 and urged toward the carriage 19 by a spring and with an upper head 22 (see FIGS. 3 and 6) being attached thereto. When the stepping motor 14 is rotated by a desired number of steps, the rotation of the pulley 15 and steel belt 17 is transmitted to the carriage 19, whereby the carriage 19 is moved an amount corresponding to the rotation of the pulley 15 along the guide shaft 18. In a disc unclamped state, an arm portion 21a of the arm 21 is raised and held by an arm lever 23 which is integral with the clamp lever 6.

Figure 2:
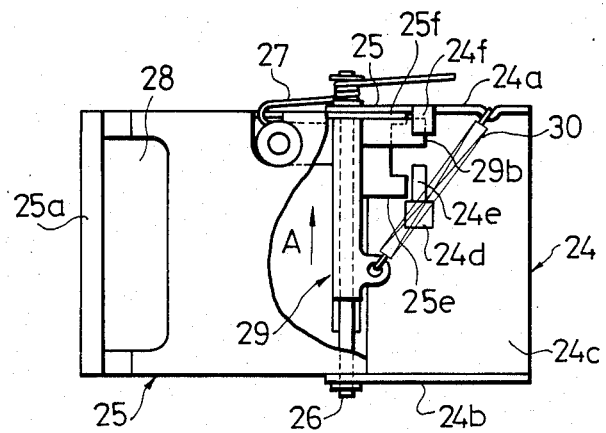
Figure 3:
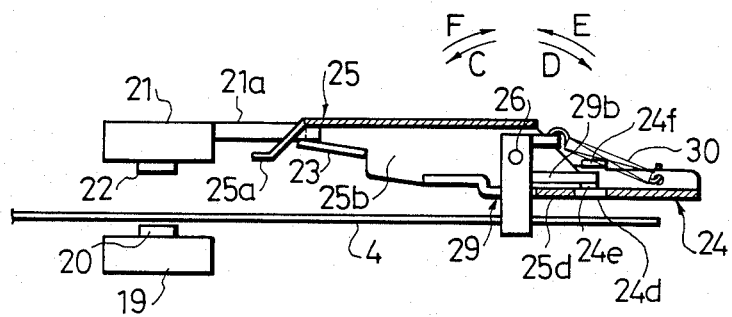
Figure 4:
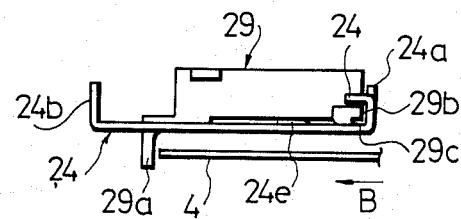
Figure 5:
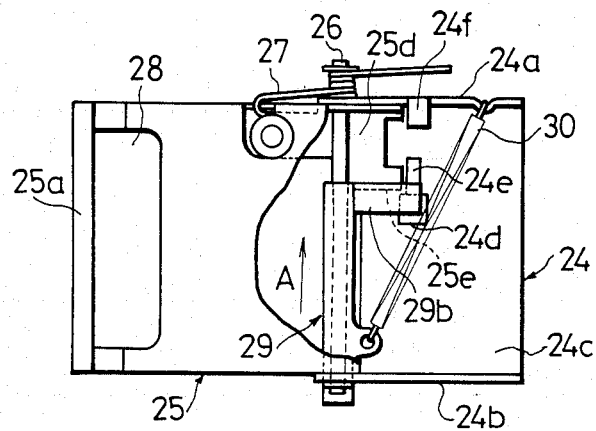
Figure 6:
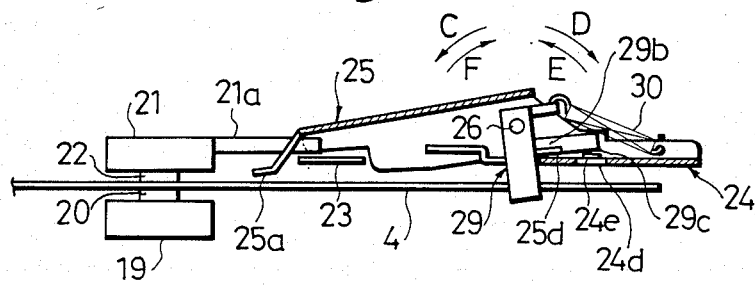
Figure 7:
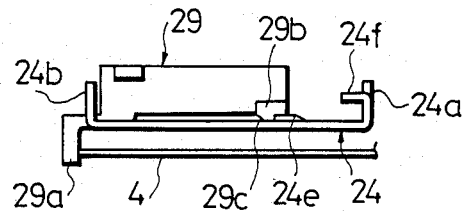
Figure 8:
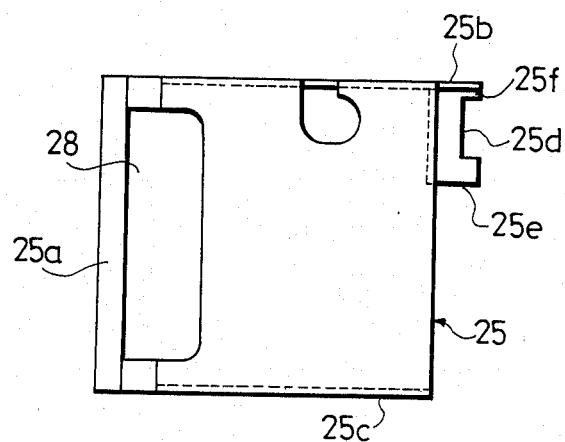
Figure 9:
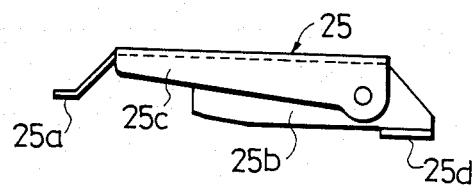
Figure 10:
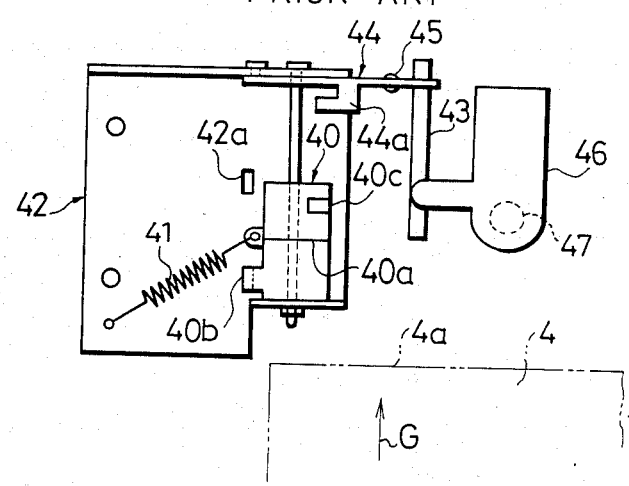
Figure 11:
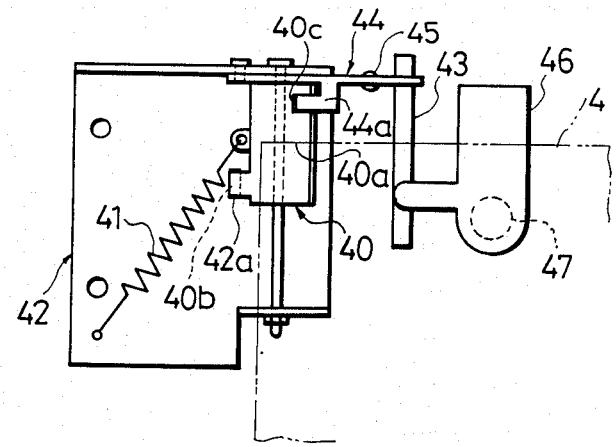
Figure 12:
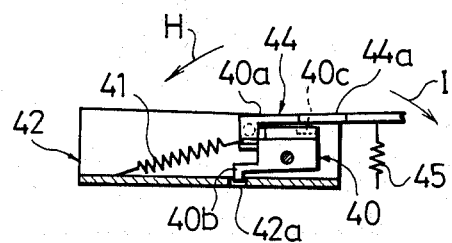
Figure 13:
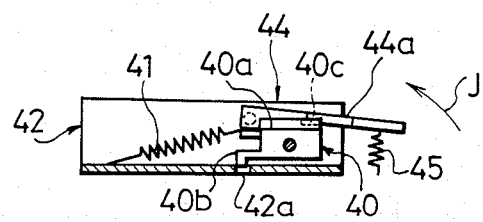

Referring now to FIGS. 2 to 9, there is shown an example of an eject mechanism used in the recording/reproducing apparatus for disc of the present invention, of which FIGS. 2, 3 and 4 are a partially cut-away plan view of the eject mechanism, a side view thereof and a front view of a principal portion thereof, respectively, in an unclamped state with a disc not inserted; FIGS. 5 and 7 are a partially cut-away plan view of the eject mechanism and a front view of a principal portion thereof, respectively, in a temporarily held state of a disc; FIG. 6 is a partially cut-away side view of the eject mechanism in a disc clamped state; and FIGS. 8 and 9 are a plan view and a side view, respectively, of an eject lever which is a component of the eject mechanism.

In these figures, the reference numeral 24 denotes a mounting plate fixed with bolts to the body of the recording/reproducing apparatus, with upright walls 24a and 24b being formed upward on both side ends of the mounting plate 24. In a plane portion 24c of the mounting plate 24 are formed a generally square hole 24d and a stepped part 24e, the stepped part 24e being formed by cutting and raising the plane portion 24c at one side of the hole 24d closer to the upright wall 24a. Further provided is a retaining plate 24f projecting perpendicularly inwards from the upright wall 24a. Numeral 25 denotes an eject lever which is urged by virtue of a helical spring 27 in a downward direction orthogonal to the paper surface of FIG. 2 pivotally about a support shaft 26 which is mounted to the mounting plate 24. At a fore end portion of the eject lever 25 is formed a support portion 25a for supporting the arm portion 21a of the arm 21, and a space 28 is formed inside the support portion 25a, in which space is positioned the arm portion 21a. Moreover, as shown in FIGS. 8 and 9, upright walls 25b and 25c are formed downward on both side ends of the eject lever 25, and an operating plate 25d, which is generally ]-shaped in plan, extends perpendicularly inwards from a lower end of the upright wall 25b, the operating plate 25d having a hook portion 25e and an abutting face 25f.

Numeral 29 denotes an ejector formed of a synthetic resin with the support shaft 26 extending therethrough between the mounting plate 24 and the eject lever 25. By means of a spring 30 provided between the ejector 29 and the mounting plate 24 the ejector is urged slidably along the support shaft 26 toward the insertion opening of the disc 4 and pivotably about the same shaft in the direction of arrow D in FIG. 3. Formed integrally with a fore end portion of the ejector 29 is a downwardly extending pressing portion 29a with which an insertion-side fore end of the disc 4 comes into abutment, while formed integrally with a rear end portion of the ejector 29 is a transversely extending engaging portion 29b which is generally in the form of a rectangular parallelopiped. As shown in FIG. 4, moreover, a pawl part 29c formed on a lower surface of the engaging portion 29b is in a stepped form for engagement with the stepped part 24e of the mounting plate 24 or with the hook portion 25e of the eject lever 25 at the time of insertion of the disc 4.

The eject mechanism constructed as above operates as follows. In recording/reproducing operation, first the disc 4 is inserted from the insertion opening of the apparatus. In this case, while the fore end portion of the disc 4 is not in abutment with the pressing portion 29a of the ejector 29 as shown in FIG. 2, the ejector 29 is in a position of abutment with the upright wall 25b of the eject lever 25 because it is urged in the direction of arrow A by virtue of the spring 30, and as shown in FIG. 3 the support portion 25a of the eject lever 25 is held in its raised position by the arm lever 23 against the force of the helical spring 27. The arm 21 with the upper head 22 attached thereto is also held in its raised position by the arm lever 23.

As the disc 4 is further pushed in the direction of arrow B in FIG. 4, its fore end portion abuts the pressing portion 29a of the ejector 29, so that the ejector 29 moves in the direction of arrow B together with the disc 4 against the force of the spring 30. When the pawl part 29c of the ejector 29 reaches the position corresponding to the stepped part 24e of the mounting plate 24, it is brought into engagement with the stepped part 24e by the pivoting force of the ejector 29 in the direction of arrow D in FIG. 3 around the shaft 26 induced by the spring 30, as shown in FIGS. 5 and 7, and thus a first lock, or a temporary lock, is effected whereby the movement of the disc 4 and that of the ejector 29 are stopped and the disc 4 assumes a stand-by state.

Then, to clamp the disc 4, when the operating lever 3 shown in FIG. 1 is pivoted in a clockwise direction as viewed from the front plate 2 side, the arm lever 23 descends interlockedly with the clamp lever 6, so that the eject lever 25 pivots in the direction of arrow C in FIG. 3 by virtue of the helical spring 27. As a result, the operating plate 25d of the eject lever 25 pivots about the shaft 26 in the direction of arrow E and therefore the engaging portion 29b of the ejector 29 is raised in the direction of arrow E by the operating plate 25d against the pivoting force of the ejector 29 in the direction of arrow D induced by the spring 30, whereby the temporary lock between the pawl part of the ejector 29 and the stepped part 24e of the mounting plate 24 is released. Thereafter, the ejector 29 moves slightly in the direction of arrow A in FIG. 5 and its pawl part 29c comes into engagement with the hook portion 25e of the operating plate 25d to effect a second lock, or a regular lock. With further descent of the arm lever 23, the arm 21 supported by the arm lever 23 goes down and the upper head 22 comes into contact with a predetermined surface portion of the disc 4, now ready for information recording or reproducing.

In eject operation, when the operating lever 3 shown in FIG. 1 is turned in a counterclockwise direction as viewed from the front plate 2 side to unclamp the disc 4, the arm lever 23 rises in interlock with the clamp lever 6, whereby the eject lever 25 is turned in the direction of arrow F in FIG. 6 against the force of the helical spring 27. At the same time, the arm 21 goes up and the upper head 22 moves away from the surface of the disc 4. With subsequent turning of the eject lever 25 in the direction of arrow F, the operating plate 25d of the eject lever turns in the direction of arrow D about the support shaft 26. The ejector 29 is also turned in the direction of arrow D about the shaft 26 by virtue of the spring 30. Consequently, the engaging portion 29b of the ejector 29 turns in the direction of arrow D in a state of contact with the operating plate 25d. When a lower surface of the pawl part 29c of the engaging portion 29b abuts an upper surface of the stepped portion 24e, the turning motion of the engaging portion 29b is stopped. But the operating plate 25d further turns downward, so the regular lock between the pawl part 29c and the hook portion 25e of the operating plate 25d is released and the ejector 29 is pulled back in the direction of arrow A by virtue of the spring 30, whereby the disc 4 is ejected toward the insertion opening.

The above is the operation of the eject mechanism when the disc is inserted and clamp/eject operation performed. Description will now be provided about the operation of the eject mechanism when the clamping operation is performed without insertion of the disc. When the operating lever 3 shown in FIG. 1 is turned clockwise as viewed from the front plate 2 side in the state of FIGS. 2 and 3 with the disc 4 not inserted, the arm lever 23 goes down in interlock with the clamp lever 6, so that the eject lever 25 begins to turn in the direction of arrow C in FIG. 3 by virtue of the helical spring 27 and its operating plate 25d turns in the direction of arrow E about the shaft 26. Consequently, the engaging portion 29b of the ejector 29 is raised in the direction of arrow E by the operating plate 25d against the force of the spring 30. However, upon a slight rise of the engaging portion 29b, its upper surface comes into engagement with a lower surface of the retaining portion 24f of the mounting plate 24, whereby a further pivotal movement of the engaging portion 29b and eject lever 25 is prevented. As a result, only the arm lever 23 goes down to a head load position and the support portion 25a of the eject lever 25 stops descending in a predetermined position. Consequently, the arm 21 is supported at its arm portion 21a by the support portion 25a and thus it is held in a raised state in a predetermined position.

When the operating lever 3 is turned counterclockwise as viewed from the front plate 2 side to release the clamp, the eject lever 25 is turned in the direction of arrow F against the force of the helical spring 27 by means of the arm lever 23 which is interlocked with the clamp lever 6. As a result, the operating plate 25d of the eject lever 25 turns in the direction of arrow D, so the engaging portion 29b of the ejector 29 turns in the same direction by virtue of the spring 30 and moves away from the retaining plate 24f with which it has been engaged, thus returning to the state of unclamp.

According to the present invention, as set forth hereinabove, when clamping operation is done without insertion of a disc, the engaging portion of the ejector and the retaining portion of the mounting plate come into engagement with each other, under which condition the arm with an upper head attached thereto is held in an upper position by the eject lever. Consequently, it is possible to prevent the upper head from going down and abutting a lower head directly and hence prevent an abutting damage of both heads. It is also possible to prevent a collision damage of both heads upon exertion thereon of a strong external vibration or shock.

What is claimed is:

1. An eject mechanism for insertion and ejection of a disk in a recording and reproducing apparatus having a housing, a front insertion slot for inserting a disk in the housing, a disk insertion path defined in the housing for inserting a disk up to a drive position therein, a clamping mechanism for clamping an inserted disk on a rotatable turntable, and a head support arm supporting a head element above the disk for lowering and raising the head element toward or away from the disk for recording and reproducing operations thereon, said eject mechanism comprising:

an ejector (29) biased by biasing means (30) toward a front position in said housing for ejecting a disk from the drive position toward the front position out through said front insertion slot, said ejector being movable by abutment with an inserted disk along an axis that is parallel to and in the direction of said disk insertion path and also being pivotable about said axis, and having an abutment portion (29a) disposed toward the rear of said housing and an engaging portion (29b) disposed toward the front of said housing, said abutment portion extending across said disk insertion path for abutting the leading edge of an inserted disk for moving said ejector axially against the force of said biasing means to the drive position when a disk is inserted in said housing, and said engaging portion being engaged by a retaining member (24f) fixed in said housing when said ejector is at said front position for preventing said ejector from pivoting movement above said axis, said engaging portion being remote from said retaining member at said drive position thereby allowing pivoting movement of said ejector;

a lock mechanism, including a lower pawl (29c) of said ejector engaging a stepped part (24e) of a mounting plate (24) in said housing, for locking said ejector in place when the disk is inserted to the drive position, said lock mechanism being released by disengagement of said lower pawl (29c) of said ejector during operation of said clamping mechanism to unclamp the disk, thereby allowing said ejector to be pulled by said biasing means toward the front position to eject the disk;

an arm lever (23) forming a part of said clamping mechanism which is moved toward the disk when the clamping mechanism is operated to clamp the disk on the turntable, said arm lever having one end engaging said head support arm (21, 21a) for allowing said head support arm to be lowered when said arm lever is lowered toward the disk, and for raising said head support arm when said arm lever is raised upward from the disk; and an eject lever (25) pivotably mounted along said axis with one end (25a) extending in one transverse direction perpendicular to the disk insertion direction so as to be engageable with said head support arm, said eject lever being biased by a second biasing means (27) so as to bear against said arm lever downwardly toward the disk and having a plate (25d) extending in an opposite transverse direction which bears upwardly against said engaging portion of said ejector;

wherein when said ejector is moved to said drive position by abutment of an inserted disk against said abutment portion in the disk insertion direction and said engaging portion becomes remote from said fixed retaining member to allow pivoting movement of said ejector at the drive position, and when said arm lever is lowered with said clamping mechanism to allow lowering of said head support arm, said plate of said eject lever is rotated upwardly along with the pivoting movement of said ejector and said engaging portion thereof so that said one end of said eject lever is pivoted downwardly to allow lowering of said head support arm, whereas when said ejector is in the front position when a disk has not been inserted, said engaging portion of said ejector is engaged with said fixed retaining member which prevents said ejector from pivoting element, and said plate of said eject lever is abutted with said engaging portion of said ejector which prevents said eject lever from pivoting movement, thereby said one end of said eject lever holds said head support arm with said head element from moving downward even if said arm lever is operated so as to be lowered.

* * * * *